Oct. 9, 1956
A. H. MARTIN
2,766,062
SIDEBOARD PANEL ATTACHMENT FOR CONVERTIBLE VEHICLE
Filed June 22, 1955
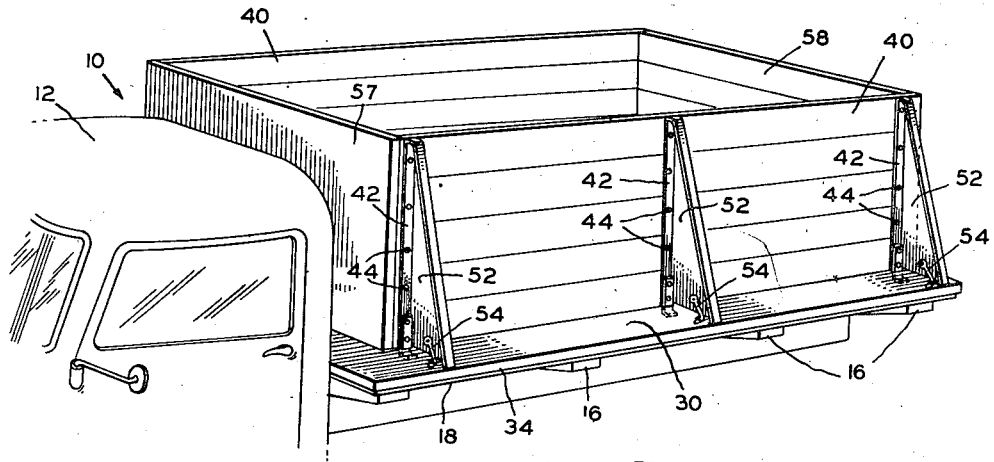
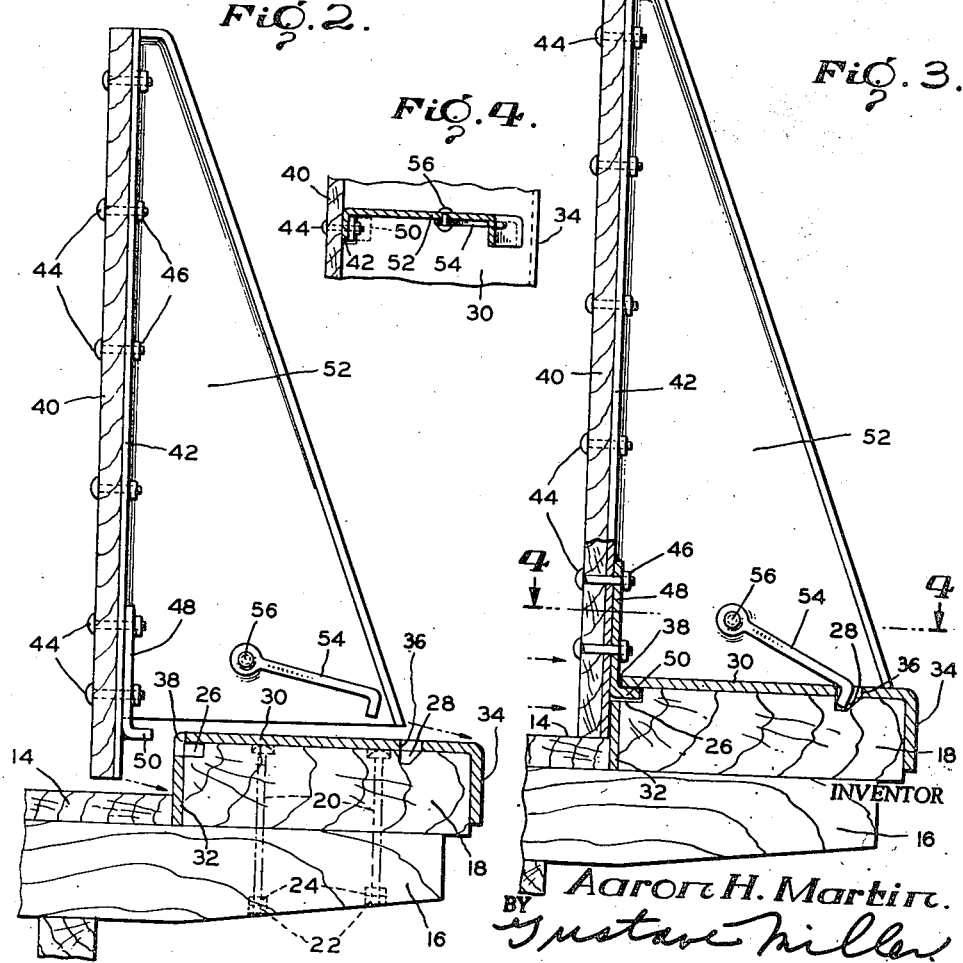
INVENTOR
Aaron H. Martin.
BY Gustave Miller
ATTORNEY

United States Patent Office 2,766,062
Patented Oct. 9, 1956

2,766,062

SIDEBOARD PANEL ATTACHMENT FOR CONVERTIBLE VEHICLE

Aaron H. Martin, Hagerstown, Md.

Application June 22, 1955, Serial No. 517,127

5 Claims. (Cl. 296—10)

This invention relates to the positioning of side panels on a flat surface such as a flat wagon or truck, and it particularly relates to means for assembling and locking said panels in position.

It is often necessary to convert a flat wagon or truck into an enclosed vehicle for carrying certain loads. Since it is obviously prohibitively expensive, in most cases, to own both types of vehicles, it is highly important that one conveyance be readily convertible from one type to the other. Such conversion must be easy to accomplish without the exercise of any special skill, while, at the same time, the converted vehicle must be sufficiently strong and steady to accomplish its purposes.

In view of the above, it is one object of the present invention to provide a vehicle which can quickly and easily be converted from a flat type to an enclosed type without the exercise of any special skill.

Another object of the present invention is to provide a convertible vehicle of the flat-topped type wherein upstanding panels can be rigidly, but releasably secured in an efficient and simple manner.

Another object of the present invention is to provide a vehicle which is convertible from the flat to the enclosed type wherein the load itself aids in maintaining the closure panels in position.

Other objects of the present invention are to provide an improved device, of the character described, that is easily and economically produced, which is sturdy in construction, and which is highly efficient in operation.

With the above and related objects in view, this invention consists in the details of construction and combination of parts, as will be more fully understood from the following description, when read in conjunction with the accompanying drawing in which:

Fig. 1 is a fragmentary perspective view of a truck embodying the present invention.

Fig. 2 is a sectional view of one of the side panels of Fig. 1, showing one of the brace members in side elevation; the panel being illustrated just prior to being positioned in place.

Fig. 3 is a view similar to Fig. 2, but showing the side panel locked in place.

Fig. 4 is a cross-sectional view taken on line 4—4 of Fig. 3.

Referring now in greater detail to the drawing wherein similar reference characters refer to similar parts, there is shown a truck, generally designated 10, comprising a cab 12, the ordinary chassis and wheels, not shown, and a flat bed or flooring 14 supported on cross-beams 16. A wooden board or stringer 18 extends longitudinally of the flooring alongside opposite edges thereof; these stringers being supported laterally of the flooring, on the cross-beams 16, by means of bolts 20. The end portions of the bolts 20 extend into counterbores 22 in the bottom surfaces of the cross-beams, and are held therein by nuts 24. A series of slots 26 are provided in the upper side of the stringers 18, adjacent the flooring, and a series of holes 28 are provided in the top of each stringer.

A steel stringer or cover plate 30 encloses the top and sides of each stringer 18; these cover plates each having a flange 32 at the inner side and a flange 34 at the outer side. These flanges overlie the sides of the stringers 18. The top surfaces of the cover plates 30 are each provided with holes 36 coinciding with holes 28 in the stringer 18, and with slots 38 coinciding with slots 26.

When it is desired to convert the flat-topped vehicle to an enclosed vehicle, a side panel 40 is set up at each side of the flooring 14. These side panels 40 are each provided on their outer surfaces with a series of steel straps 42 connected to the side panels by bolts 44 and nuts 46. The two bottom bolts 44 and nuts 46 on each strap also act to connect a hook device 48, having a lateral hook portion 50, to the side panel. These hook portions 50 are spaced vertically above the bottom plane of the corresponding side panel.

Extending laterally of each strap 42 is a triangular steel brace 52 in the general shape of a right triangle. Adjacent the bottom edge of each brace 52 is provided a retaining hook 54 pivotally connected to the brace by a pivot pin 56.

In assembling the enclosure, each of the side panels 40 is mounted adjacent a side edge of the flooring by bringing the bottom of the panel close to the corresponding stringer, and then permitting the panel to drop until the hook portions 50 are in line with slots 26 and 38. The panel is then moved laterally until the hook portions enter the corresponding slots where they hook under the edge of the top portion of the steel stringer 30. The retaining hooks 54 are then inserted in the holes 28. The front and rear panels 57 and 58 are then secured in any suitable manner to the side panels to complete the enclosure. If desired, the front and rear panels are also provided with brace means and hooked locking means such as provided for the side panels. In such case, all four panels are individually supported and need not depend upon any interengagement with any of the other panels.

When the truck is loaded, the inherent lateral thrust of the load acts to push the panels outwardly whereby the hook portions 50 are forced more strongly into their slots to keep the panels secured in place. When no load or an insufficient load, is present, so that no lateral thrust is exerted against the panels, the retaining hooks 54 act to hold the panels in position.

Quick removal of the panels is effected by first removing the front and rear panels, if not separately supported. If they are separately supported in the manner of the side panels, then all four panels are removed by lifting the retaining hooks 54 out of the holes 36 and, thereafter, sliding the panels and attached brace means laterally inward until the hook portions 50 are disengaged from the slots 26 and 38; after which they may be lifted vertically away from the flooring.

The materials, such as steel and wood, specified above, are the materials preferably used in this construction; however, other similar or desirable materials may be substituted therefor, within the scope of this invention.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. In combination, a flat support having a raised portion at opposite edges thereof, a laterally extending series of slots at the upper, inner edge of each of said raised portions, a series of openings in the top wall of said raised portions, panels positioned at opposite edges of said flat support and connected to each of said raised portions, said connections comprising a series of locking hooks extending laterally outward from said panels, said locking hooks releasably engaging in said slots, a series of laterally extending brace means rigidly connected to each panel in perpendicular relation thereto on the outer surface thereof to abut the upper surface of said raised portion, and a pivoted retaining hook on each of said brace means, said pivoted retaining hooks releasably engaging said openings.

2. The combination of claim 1 for use with a flat truck support bed wherein said raised portions each comprises an elongated beam having a cover plate thereon of relatively harder material, said beam being provided with said slots and openings, and said cover plate having slots and openings coinciding with those of said beam.

3. The combination of claim 1 wherein said locking hooks and said retaining hooks each act to exert an engagement force between said panels and said raised portions when exposed to oppositely directed forces.

4. A panel structure for quick attachment to and detachment from a flat truck bed having a raised portion at opposite edges thereof, and a laterally extending series of slots at the upper, inner edge of each of said raised portions, said panel structure comprising a flat panel having a series of straps connected to said panel in spaced relationship with each other, a hook connected to each of said straps and extending laterally of said panel, said hooks being in vertically raised position relative to the bottom edge of said panel for releasably engaging in said slots in said raised portions, a triangular brace connected to each strap, said brace forming a right angle with its corresponding strap and with said panel, and having its base on the bottom end thereof, and a retaining hook pivotally connected to the bottom portion of each brace.

5. In combination, a flat truck support bed having a raised portion at opposite edges thereof, laterally extending series of slots at the upper, inner edge of each of said raised portions, panels positioned at opposite edges of said flat truck support bed and connected to each of said raised portions, said connections comprising a series of locking hooks releasably engaging in said slots, a series of laterally extending rigid brace means connected to each panel on the outer surface thereof at a right angle thereto to abut the upper surface of said raised portion, whereby the inherent lateral thrust of the load on the flat truck support bed acts to push the panels outwardly thereby locking said laterally extending hooks in said slots to lock said panels in position thereon.

References Cited in the file of this patent

UNITED STATES PATENTS

| 322,184 | Jonas | July 14, 1885 |
| 419,689 | Lang | Jan. 21, 1890 |
| 1,208,182 | Martin | Dec. 12, 1916 |
| 1,445,886 | Horsch | Feb. 20, 1923 |
| 1,485,279 | Landis | Feb. 26, 1924 |
| 1,573,750 | Schreader | Feb. 16, 1926 |